April 9, 1940.   R. A. L. SELIGMAN   2,196,340
AIRCRAFT ENGINE
Filed Dec. 28, 1938   3 Sheets-Sheet 1
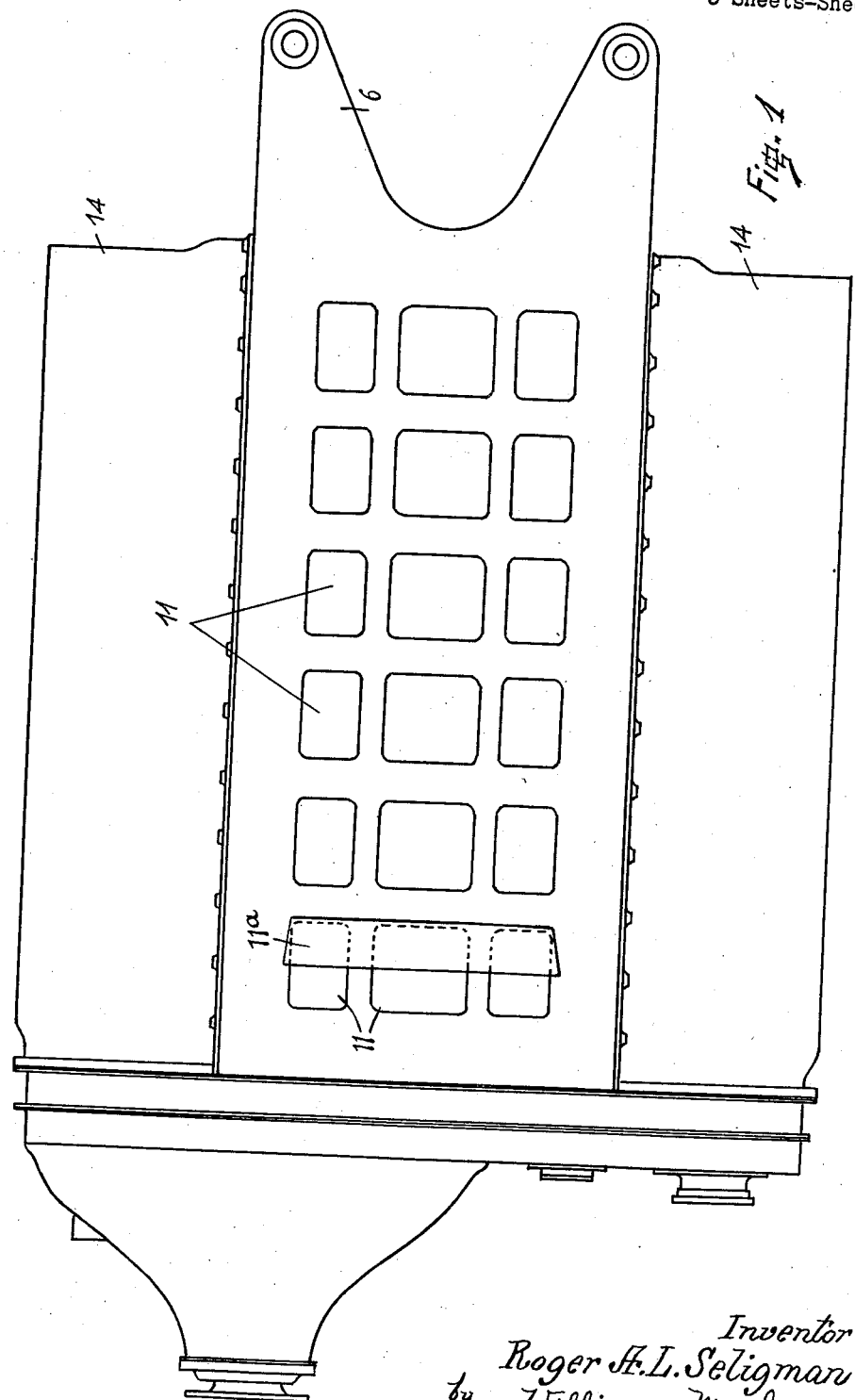
Inventor
Roger A. L. Seligman
by Wilkinson & Mawhinney
Attorneys.

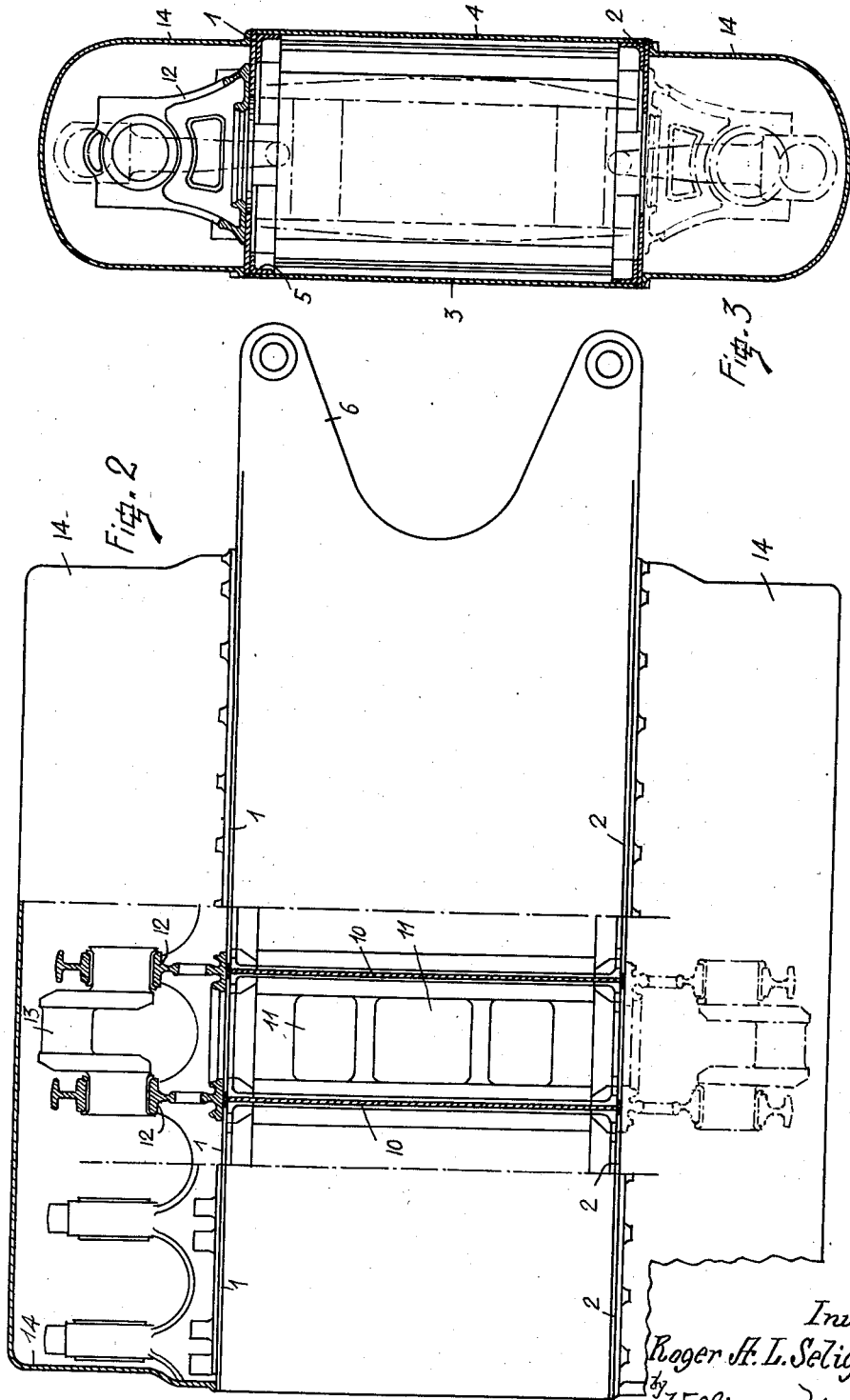

April 9, 1940.   R. A. L. SELIGMAN   2,196,340
AIRCRAFT ENGINE
Filed Dec. 28, 1938   3 Sheets-Sheet 3
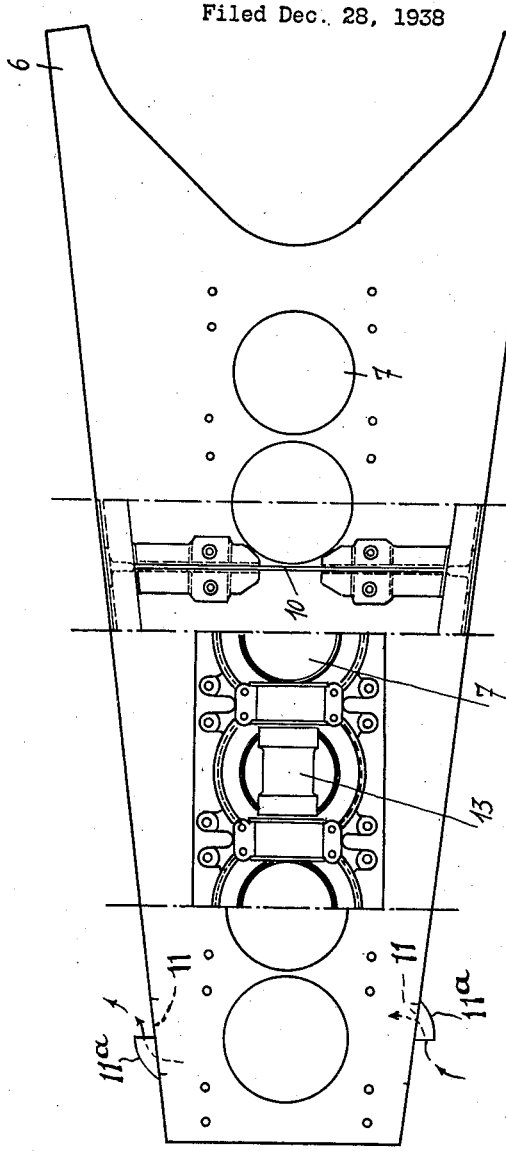
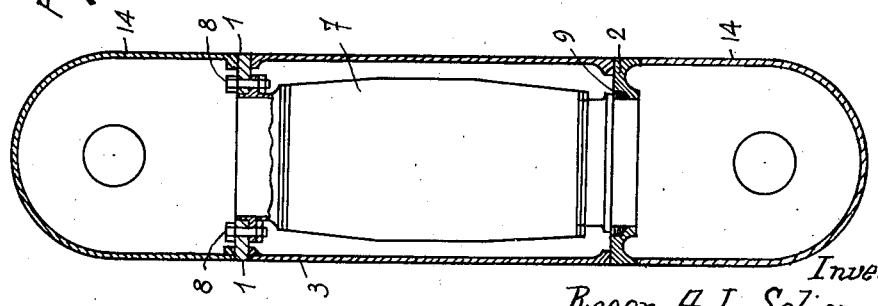
Inventor
Roger A. L. Seligman
by Wilkinson & Mawhinney
Attorneys.

Patented Apr. 9, 1940

2,196,340

UNITED STATES PATENT OFFICE 2,196,340

AIRCRAFT ENGINE

Roger Adolphe Leonard Seligman, Neuilly, Seine, France

Application December 28, 1938, Serial No. 248,100
In France June 16, 1938

5 Claims. (Cl. 123—195)

The fixing of engines on the fuselages of aircraft is generally obtained by means of an engine mounting which is secured to the framework of the aircraft and on which the crankcase of the engine is bolted or otherwise removably fixed.

The present invention enables said engine mounting to be eliminated. Said invention essentially consists in forming the crankcase of the engine in the shape of a rigid and undeformable box-girder which is provided on the one hand with means for receiving the cylinders and all the other members of the engine, and on the other hand with means which enable it to be directly fixed on the framework of the aircraft, in place of the engine mounting usually employed.

According to an embodiment, said box-girder is formed by two upper and lower horizontal plates, and two longitudinal side plates which are rigidly secured to the horizontal plates, the cylinders being fixed independently of each other inside said girder.

Said girder is provided on the inside with cross-pieces or partitions which separate the cylinders from each other and perform the dual function, on the one hand of reinforcing said girder, and on the other hand, in the case of air-cooled engines, of forming compartments in which a current of air is set up in an appropriate manner.

This invention is applicable to all types of engines. However, its application is particularly advantageous in the case of engines having as known two opposed pistons in each cylinder and, consequently, two crankshafts.

In this particular application, the invention is characterized by the fact that the upper and lower horizontal plates, respectively carry the upper crankshaft and the lower crankshaft, the parallelism of which is thus accurately maintained owing to the actual undeformability of the box-girder and without any special arrangement having to be provided for maintaining said parallelism.

Said particular application may be further characterized by the fact that each of the cylinders is fixed, by one of its ends, to only one of the horizontal plates, whereas its other end can move relatively to the opposite plate, thereby permitting of a free expansion of said cylinders without any effect on the other members of the engine.

Other advantages and peculiarities of the invention will become apparent from the ensuing description taken in conjunction with the accompanying drawings which show, diagrammatically and simply by way of example, the application of the invention to an engine having opposed pistons. In said drawings:

Fig. 1 is an outside elevational view of an improved engine according to the invention.

Fig. 2 is a view in partial section of the box-girder, the cylinders being assumed to be removed.

Fig. 3 is a corresponding view, in transverse section, only the support for the upper crankshaft being shown.

Fig. 4 is a plan view in partial section.

Fig. 5 is a transverse section passing through the longitudinal axis of one of the cylinders.

As shown in said drawings, the element which, according to the invention, simultaneously has to act as a crankcase for the engine and as a support for enabling same to be fixed on the framework of an aircraft, comprises a box-girder which is formed by a horizontal upper plate 1, a lower horizontal plate 2, two side plates 3 and 4 and cross-pieces such as 10, the distance between which is equal to the distance between the axes of the cylinders. These four plates and cross-pieces, which are made for example of steel plate, are rigidly assembled together in any appropriate manner. They may, for example, be riveted or welded together, the rivetting is effected through the intermediary of angles such as 5).

The whole of the box-girder thus formed may of course be of any appropriate shape. Thus, in the example shown, the horizontal plates 1 and 2 are of generally trapezoidal shape. At one of its ends, said box-girder is provided with lugs such as 6 at the end of each of which are provided the usual means for enabling said box-girder to be fixed to the corresponding end of the framework of the aircraft at four points arranged at the corners of a rectangle, under the same conditions as the engine mounting is at present fixed on the usual aeroplanes, on which engine mounting is in turn fixed the crankcases of ordinary engines.

Inside said box-girder are fitted the cylinders 7 of the engine (six cylinders in the example shown). In order to permit of the free expansion of said cylinders, each of same is rigidly fixed to the upper horizontal plate 1 by means for example of bolts 8 (Fig. 5), whereas at its lower part said cylinder 7 can slide relatively to the lower plate 2, a joint made of compressible material being provided at 9.

The cross-pieces 10 perform two functions. In the first place, they reinforce said box-girder and make it completely undeformable. In the second place, for air-cooled engines, and this is only accessory, they form in said box-girder a compartment for each cylinder, and in each of said compartments a current of cooling air can be set up. For this purpose, opposite each of said compartments, the side plates 3 and 4 are provided with openings such as 11. The openings 11 of one of the plates are provided with ears 11a which are directed in such a manner as to cause the air to flow into the corresponding compartment, whereas the orifices 11 of the opposite side plate are provided with ears 11a which enable the air to flow out. These ears 11a are shown in Figure 4. The incoming and outgoing flow of air is, or may be, as indicated by the arrows in Figure 4. The ears 11a have been represented only for the first cylinder.

On the upper face of the upper horizontal plate 1 is provided a support such as 12 which is provided with bearings in which the upper crankshaft 13 rotates. Similarly, the lower face of the lower horizontal plate 2 is provided with a similar support, shown in dotted outline. The upper crankshaft and the lower crankshaft are respectively enclosed in appropriate crankcases, such as 14.

The box-girder according to the invention offers a large number of important advantages. In the first place, it alone replaces the usual crankcase of the engine and the supporting frame which is usually fitted on the framework of the aircraft. Furthermore, at the present time before fixing such a supporting frame on the framework of an aircraft, it is necessary to brace said framework so as to increase its rigidity. With the box-girder according to the invention, this previous bracing of the framework is useless since the box-girder, which is itself rigid and undeformable, ensures the bracing and the undeformability of said framework by the sole fact of its being fixed on same.

On the other hand, and still owing to its undeformability, said box-girder always ensures an absolute parallelism between the two crankshafts of the engine without its being necessary to provide particular arrangements for that purpose, as is required with the present known engines. Finally, by means of the above described mounting of the cylinders, the expansion of same can take place freely without having any effect on the other members of the engine.

It is moreover obvious that the invention has only been described and illustrated herein in an explanatory and non-limitative manner and that modifications of detail may be made therein, without altering its spirit.

I claim:

1. A crankcase for aircraft engines, comprising a rigid and undeformable box-girder formed by two upper and lower horizontal plates, and two longitudinal side plates rigidly secured to said horizontal plates, means for fixing the cylinders inside said girder, and means for directly fixing said girder on the framework of the aircraft, in place of the usual engine mounting.

2. A crankcase for aircraft engines, comprising a rigid and undeformable box-girder formed by two upper and lower horizontal plates and two longitudinal side plates rigidly secured to said horizontal plates, means for fixing one of the ends of each cylinder to one of said horizontal plates, the other end of each cylinder being free to move relatively to the opposite plate, thereby allowing said cylinders to expand freely, and means for directly fixing said girder on the framework of the aircraft, in place of the usual engine mounting.

3. A crankcase for air-cooled aircraft engines, comprising a rigid undeformable box-girder formed by two upper and lower horizontal plates, two longitudinal side plates rigidly secured to said horizontal plates and reinforcing cross-pieces forming a compartment for each cylinder, means for passing a current of cooling air through said compartments, means for fixing one of the ends of each cylinder to one of said horizontal plates, the other end of each cylinder being free to move relatively to the opposite plate, thereby allowing the cylinders to expand freely without affecting the other members of the engine, and means for directly fixing said girder on the framework of the aircraft, in place of the usual engine mounting.

4. A crankcase for engines which have opposed pistons and an upper and lower crankshaft, comprising a rigid undeformable box-girder formed by two upper and lower horizontal plates, and two longitudinal side plates, said two upper and lower horizontal plates respectively carrying the upper and the lower crankshaft, thereby maintaining an absolute parallelism of said crankshafts owing to the undeformable structure of said box-girder, means for fixing the cylinders independently of each other inside said girder, lugs formed at one end of said girder, and means on said lugs for fixing said girder to the framework of the aircraft, in place of the usual engine mounting.

5. A crankcase for aircraft engines which have opposed pistons and an upper and lower crankshaft, comprising a rigid undeformable box-girder formed by two upper and lower horizontal plates, two longitudinal side plates and reinforcing cross-pieces between said upper and lower horizontal plates, said cross-pieces forming a compartment for each cylinder, means for passing a current of cooling air through said compartments, said two upper and lower horizontal plates respectively carrying the upper and lower crankshaft, means for fixing one of the ends of each cylinder to one of said horizontal plates, the other end thereof being free to move relatively to the opposite plate, thereby allowing the cylinders to expand freely without affecting the other members of the engine, and means for directly fixing said box-girder on the framework of the aircraft, in place of the usual engine mounting.

ROGER ADOLPHE LEONARD SELIGMAN.